United States Patent
Gordin

Patent Number: 5,308,717
Date of Patent: May 3, 1994

[54] BATTERY JIG

[75] Inventor: Patrick D. Gordin, Oskaloosa, Iowa

[73] Assignee: S & K Racing Products, Inc., Oskaloosa, Iowa

[21] Appl. No.: 835,132

[22] Filed: Feb. 12, 1992

[51] Int. Cl.⁵ .............................................. H01M 2/10
[52] U.S. Cl. ..................................... 429/99; 429/100; 24/71 TD
[58] Field of Search ............... 429/99, 100; 24/71 TD

[56] References Cited

U.S. PATENT DOCUMENTS

| 4,020,244 | 4/1977 | Selinko | 429/100 |
| 4,091,187 | 5/1978 | Kaye | 429/99 |
| 4,510,215 | 4/1985 | Adam | 429/99 |

Primary Examiner—Prince Willis, Jr.
Assistant Examiner—M. Nuzzolillo
Attorney, Agent, or Firm—Zarley, McKee, Thomte, Voorhees & Sease

[57] ABSTRACT

The battery clamping jig for smaller sized single cell batteries. The jig holds a plurality of batteries in parallel and spaced apart position with opposite ends exposed as that batteries can easily be electrically connected together by soldering conducting strips between batteries. A bottom plate includes recesses matingly or fittingly conforming to at least a portion of the batteries. A top plate also has similar recesses. A restraining member such as a strap with hook end loop fastening material on it can be used to clamp and hold the top and bottom plates together either to clamp batteries in position, or to hold the first and second plates together securely for transport or storage. The jig can be used for as few as two batteries or for many more batteries.

15 Claims, 2 Drawing Sheets

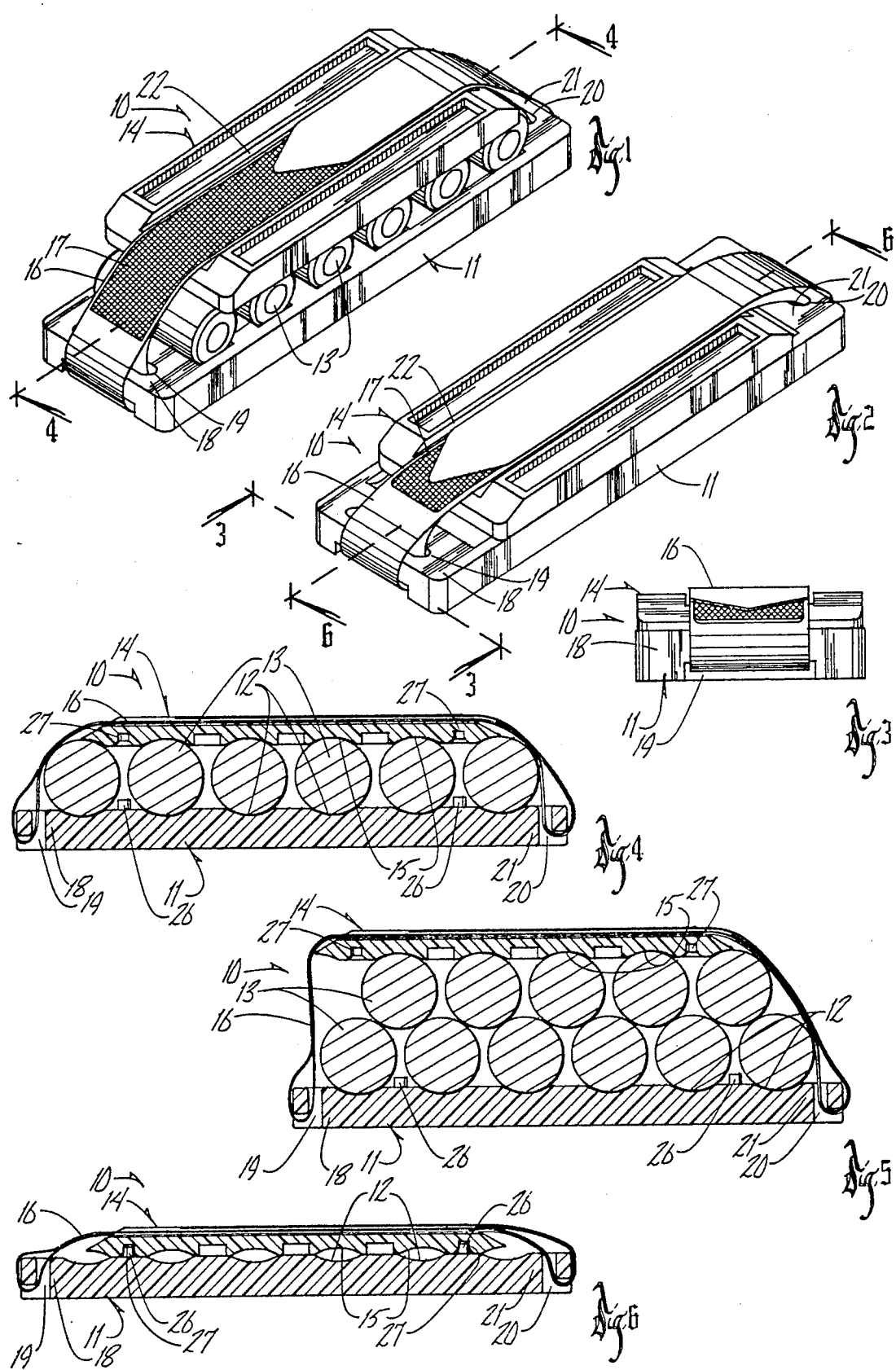

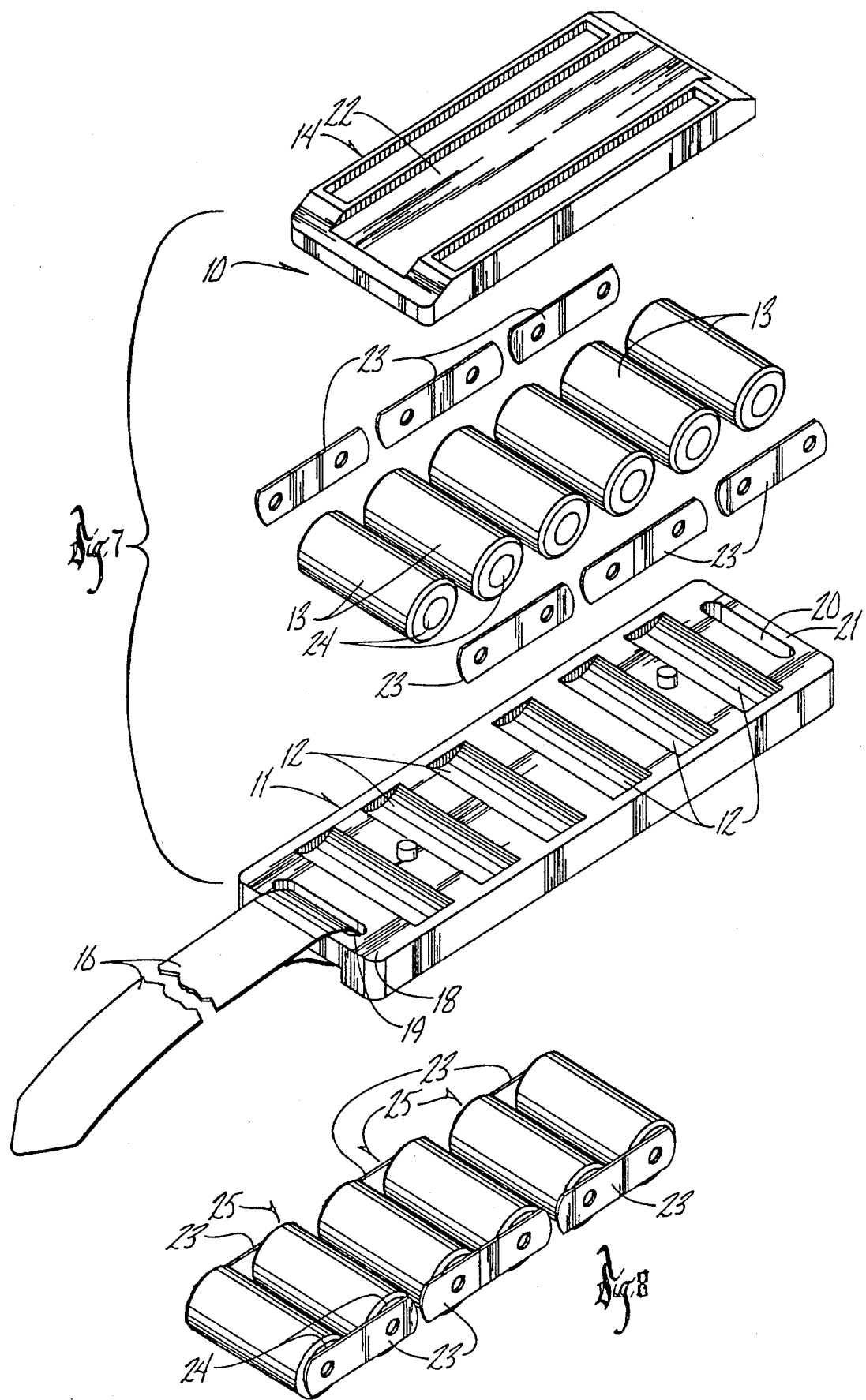

BATTERY JIG

BACKGROUND OF THE INVENTION

1. Field of the Invention

This invention allows the user to solder the contacts of multiple pairs of batteries together, more particularly it provides a means to maintain a plurality of batteries in a stable and adjacent configuration while pairs are conductively connected by soldering plates to their adjacent ends, allowing an efficient, quick, and easy tool to assist in creating a battery pack or packs out of the plurality of batteries.

2. Problems in the Art

This invention specifically addresses problems found by the inventor while attending radio-controlled ("RC") car competitions. During RC competitions, participants utilize battery packs of several individual batteries soldered in series to provide power to their miniature automobiles. Unfortunately, it often becomes necessary for the battery packs to be replaced or reconfigured during the course of a competition. Some contestants originally prepare their battery packs prior to the competition. Pairs of batteries can be produced a pair at a time. To speed up the process, several pairs can be made at once. A general configuration to accomplish this involves placing several elongated single cell batteries generally parallel and side-by-side in one or two rows. Pairs of batteries are electrically connected by soldering metal plates over adjacent ends.

While methods vary to accomplish this, the most common utilizes two pieces of wood that sandwich the batteries between them. Clamping force is provided by a vise, a clamp, or by hand. This method requires an inordinate amount of dexterity and patience; the device is large and cumbersome; and the outcome is imprecise and mediocre at best.

There is a need in the art for a device which is easy and quick to use, effective, reliable, portable, and compact. While there are individuals who attempt to bring their wooden boards and clamps on the road with them, participants in the competition feel the need for some improved alternative.

It is therefore a principal object of the present invention to provide a battery jig which improves upon or solves the problems and deficiencies existing in the art.

It a further object of this invention to provide a jig wherein a number of batteries can be positioned in a parallel orientation and held stable with the application of a constant and controllable force.

It is further the object of this invention to provide such a means that is portable and compact, allowing use at competitions as well as in the home or workshop.

These and other features, objects, and advantages of the invention will become apparent to those skilled in the art with reference to the accompanying specification.

SUMMARY OF THE INVENTION

The present invention relates to a means and method of preparing battery packs for use by battery powered devices. The invention allows accurate and reliable placement of plurality of batteries with respect for one another and secures them in this position or arrangement with their ends exposed. Adjacent sets of batteries can then be electrically connected by soldering conducting pieces between their exposed ends.

The invention includes a first plate having indentations to receive a plurality of batteries. A second plate also has similar indentations. The indentations of both plates extend transversely across the plates.

A releasable and adjustable clamping means is then provided between the plates to sandwich the batteries between the plates and hold the batteries in position so that collectively they can be lifted, moved, and rotated in any orientation while maintaining that position and maintaining exposure of the opposite ends of the batteries.

The invention is easy to operate, is economical, and is flexible in that it can be used with various numbers and sizes of batteries. It also can be conveniently prepared for transportation without batteries.

DESCRIPTION OF THE DRAWINGS

FIG. 1 is a perspective view of one embodiment of a battery jig according to the invention with batteries in position to be electrically connected.

FIG. 2 is a perspective view of the invention in a fully closed position for storage or transportation.

FIG. 3 is an end elevational view taken along line 3—3 of FIG. 2.

FIG. 4 is a sectional taken along line 4—4 of FIG. 1, showing batteries in position.

FIG. 5 is a sectional view similar to FIG. 4 but with additional batteries.

FIG. 6 is a sectional view taken along line 6—6 of FIG. 2.

FIG. 7 is a disassembled perspective view of the embodiment of the invention shown in FIG. 1, including batteries and electrical connections to be soldered to the batteries.

FIG. 8 is an isolated perspective view of the plurality of batteries of FIGS. 7 or 1 after the electrical connections have been soldered and the combination has been removed from the jig.

DESCRIPTION OF PREFERRED EMBODIMENT

In reference to the drawings, and in particular FIG. 7, there is shown a preferred embodiment of a battery jig 10 in accordance with the invention. The jig consists of a bottom plate 11 containing grooves or recesses 12 that generally conform to the size and shape of a battery 13. The grooves 12 are parallel to each other and lay along the bottom plate 11 perpendicular to the plate's longitudinal axis.

The jig also consists of a top plate 14 containing grooves 15 that roughly conform to the size and shape of a battery 13. The grooves 15, parallel to each other, lie along the top plate perpendicular to the plate's longitudinal axis (line 6—6).

The two plates 11 and 14 can be brought together in a clamp configuration and held in place by a means of adjustable retaining strap 16. The preferred embodiment of this strap utilizes hook and loop surfaces 17a and 17b as a releasable connection. One end of strap 16 is secured at a first end 18 of the bottom plate 11 in a first aperture 19. The strap 16 can then be drawn over the top 22 of the top plate 14 and through the second aperture 20 at the second end 21 of the bottom plate 11. Manual pulling of the strap 16 will force the top plate 14 towards the bottom plate 11 and clamp and immobilize any batteries 13 placed in the grooves 12 and 15. The strap 16 can then be folded back on itself and will remain in place as a result of the hook and loop material 17.

FIG. 1 illustrates six batteries held in jig 10. It is to be understood that jig 10 can be made to hold a different number of batteries 13 if desired. In this preferred embodiment, batteries 13 are single cell DC batteries of "Sub C" size. Jig 10 could be made to be used with different sized batteries.

FIG. 1 shows that strap 16 developes a generally consistent downwardly restraining force across top plate 14 and cooperates with the grooves in top plate 14 and bottom plate 11 to hold batteries 13 in place. The entire jig 10 can then be lifted, rotated, jiggled, or otherwise manipulated. Batteries 13 will remain securely in place.

FIG. 2 reveals another feature of the present invention. By utilizing strap 16 in a similar matter to that in FIG. 1, top plate 14 can be sandwiched and clamped down upon bottom plate 11 for storage or transport purposes.

FIG. 2 shows an empty jig 10. When no batteries are present the top plate 14 can be secured against the bottom plate 11 by tightening the compression means 16. Lateral or axial movement of the two plates 11,14 is curtailed by placing two pins 26 (see FIGS. 4–6) on the bottom plate 11 and forming two notches 27 on the top plate 14 opposite the pins 26. When the jig 10 is empty, the pins 26 plug into the notches 27 and restrict the top plate's movement.

FIG. 3 is an end view of FIG. 2 illustrating how top plate 14 is clamped down on bottom plate 11 for transport or storage.

FIGS. 4–6 show a cross section how the jig 10 works. FIG. 4 is a cross section of FIG. 1 showing the clamping of six batteries. Each of the batteries fits within corresponding grooves in plates 11 and 14. FIG. 5 illustrates the flexibility of jig 10. Additional batteries can be stacked on top of batteries FIG. 4 and sandwiched into place. Clamp or jig 10 can actually accommodate at least 18 batteries (11 are shown in FIG. 5).

FIG. 6 shows a cross section jig 10 of FIG. 2 in its storage or transport position, illustrating how pins 26 further serve to prevent movement between plates 14 and 11.

FIG. 1 shows a jig 10 stabilizing six batteries 13. When the batteries 13 are so positioned, metal plates or bars 23 can be soldered to the battery contacts 24 of adjacent pairs of batteries.

FIG. 7 depicts the embodiment of FIG. 1 in exploded fashion. It illustrates how adjacent pairs of batteries 13 are associated with bars 23 to electrically connect pairs of batteries 13.

FIG. 8 shows the resulting battery packs removed from jig 10. Pairs of batteries 13 are soldered together utilizing bars 23. These battery packs can then be inserted into the device utilizing the batteries, such as radio-controlled race cars.

As can be easily understood, jig 10 therefore allows easy and efficient preparation of battery packs. If the battery pack consists of two batteries, individual 2-battery packs can be quickly made in the jig, or a plurality of 2-battery packs can be made at once. If the battery packs utilize 6 batteries, all six could be held in jig 10 and the pack prepared. As explained previously, even greater numbers can be positioned for electrical connect with jig 10.

It is to be appreciated that the included preferred embodiment is given by a way of example only. The present invention can take many forms and embodiments. The true essence and spirit of this invention are defined in the appended claims, and it is not intended that the embodiment of the invention presented herein should limit the scope thereof.

For example, as stated previously, the preferred embodiment allows clamping of plurality of batteries while maintaining exposure of opposite ends of the batteries. Therefore, as can be seen in the figures, even when clamped the invention allows unobstructed access to opposite ends of the battery so that electrical connections can be made between exposed terminals, some being positive and some negative. Normally adjacent terminals of like charge are interconnected.

Furthermore, the grooves or recesses previously described serve to assist in allowing placement of spacing of the batteries apart from one another in traverse to the longitudinal axes of the top and bottom plates, again without obstruction of axes to the electrical terminals of the batteries.

It is to be further understood that preferred embodiment allows the clamping of not only a single row of batteries (see FIG. 4 for example), but also allows stacking of batteries above a bottom row of batteries (see FIG. 5). The preferred embodiment, the strap and slots in the plates allows flexibility to operate or single rows or multiple rows of batteries, again without obstructing access to the respective opposite ends of the batteries.

It is to be understood that a battery jig according to the present invention can be used for clamping in place a plurality of, or sets of, single or one cell cylindrical batteries, each having positive and negative electrical terminals at opposite ends, in generally parallel relationship with at least some adjacent ends substantially exposed to facilitate unobstructed access to at least some opposite ends for installing and working on electrical connections between adjacent ends of opposite ends of certain of the batteries to create and maintain battery packs each comprising a plurality of said batteries having adjacent electrically connected electric terminals. A first plate has a battery clamping surface with recesses spaced apart and transverse along that surface, each recess being configured to receive a portion of a battery. A second plate includes a battery clamping surface with transverse recesses like those in the first plate. Each of the plates has a longitudinal axis between opposite ends of the plate and the recesses are in the battery clamping surfaces generally equally spaced apart along and transverse to the longitudinal axis, the recesses being adapted to receive at least a portion of the battery without obstructing access to its electrical terminals.

The plates may be clamped against the batteries that are placed in the recesses of the plates by adjustable securing means that bring the plates towards one another to provide clamping pressure by the battery clamping surfaces against the batteries while leaving the opposite ends of the batteries generally unobstructed. One arrangement for the securing means could include a slot in one end of a plate, and a strap which could also be connected to an opposite end of the plate and extendible to the slot. The strap could be of a length to substantially double over itself so that it can essentially wrap up the combination of top and bottom plates with batteries in-between. There can also be a component or method of securing the strap in place once it is extended around the plates and batteries. An example is hook and loop material such as is known in the art. In this arrangement, the strap, connected to one end of a plate, can extend from that connection over the second plate along its axis, through the slot in the opposite end of the plate and back over the second plate towards the first end of the first plate and be secured to maintain clamping action on the set of batteries without obstructing access to the terminals at opposite ends. The strap would be pulled tight to apply converging pressure between first and second plates to produce the clamping force on the batteries. A groove could be positioned along the longitudinal axis of one of the plates to hold the strap in place when positioned for clamping action. Also, a pin and aperture arrangement could be used to hold the top and bottom plates in position to one another when the batteries are in-between them.

More than one row of batteries can be clamped by the invention. A second row, for example, for one or more additional batteries could be placed over an existing row of two or more batteries which have been placed in the recesses of one of the plates. The other plate could be placed over all of the batteries and clamped into place.

What is claimed is:

1. A battery jig for clamping in place a plurality of single cell cylindrical batteries having positive and negative electrical terminals at opposite ends in generally parallel relationship to facilitate unobstructed access to said opposite ends for installing and working on electrical connections between adjacent ends of opposite ends of certain of the batteries to create and maintain battery packs each comprising a plurality of said batteries having adjacent electrically connected electrical terminals comprising:

a first plate means including a battery clamping surface;
   a second plate means including a battery clamping surface;
   the first and second plate means having longitudinal axes extending between opposite ends and a plurality of recesses in the battery clamping surfaces generally equally spaced apart along and transverse to the longitudinal axes, the recesses being adapted to receive at least a portion of a battery without obstructing access to its electrical terminals;
   adjustable securing means associated with the first and second plate means for bringing the first and second plate means towards one another and providing clamping pressure by the battery clamping surfaces against the plurality of batteries therebetween, while leaving said opposite ends of the batteries generally unobstructed.

2. The means of claim 1 wherein one of the first and second plates is shorter than the other of said first and second plates.

3. The means of claim 2 wherein the other of said first and second plates has opposite ends which include slots to receive a clamping strap.

4. The means of claim 3 wherein the clamping strap is secured at one end of one of the slots on said other of said first and second plate means and is of a length that can be extended to and through the slot at the other end of the other of said first and second plate means and brought back upon itself.

5. The means of claim 4 further comprising hook and loop means on the strap means to secure the strap means to itself when doubled upon itself.

6. The means of claim 5 wherein the strap means can be passed over the one of said first and second plate means and tightened to provide clamping pressure on top of the one of said first and second plate means towards the other said first and second plate means.

7. The means of claim 3 wherein the one of said first and second plate means has a top surface including a groove along the longitudinal axis of the said first and second plate means to receive and guide the strap means.

8. A battery clamping jig for holding sets of one-cell cylindrically-shaped batteries, each having positive and negative terminals at opposite ends, in position to allow access to electrical connections between adjacent terminals without obstruction by the jig comprising:

a first plate including a long axis extending between first and second opposite ends and transverse recesses along a surface adapted to receive and position batteries along the long axis of and transversely across the first plate in parallel but spaced apart positions;
   a second plate including a long axis extending between opposite ends also including recesses adapted along a surface transverse to the long axis and to receive and position batteries in parallel but spaced apart positions;
   slot means in the second end of the first plate to receive a strap means;
   the strap means connected at said first end of the first plate and being extendable to the slot means in the second end of the first plate and of sufficient length to substantially double over itself and securement means to secure the strap means; and
   so that when a set of batteries is positioned between said first and second plates said strap mans can extend from its connection of the first end of the first plate over the second plate along its long axis, through the slot and back over the second plate towards the first end of the first plate and be secured to maintain clamping action on the set of batteries without obstructing access to their terminals at opposite ends.

9. The battery clamping jig of claim 8 wherein the recesses of the second plate are parallel to the spaced apart positions and similar to the positions of the recesses in the first plate.

10. The battery clamping jig of claim 8 wherein the first and second recesses in the first and second plates receive at least a portion of the batteries but allow the opposite ends of each battery to be substantially exposed.

11. The battery clamping jig of claim 8 wherein the strap means can be secured to itself by hoop and loop means when doubled over.

12. The battery clamping jig of claim 8 wherein the first plate is shorter in length than the second plate.

13. A battery clamping jig according to claim 8 further comprising at least one pin means on one of said first and second plates which is matable with a corresponding aperture in the other of said first and second plates when the first and second plates are brought into abutment with one another, the pin and the aperture disallowing relative movement between the first and second plates and allowing the strap means to sandwich the first and second plates to one another for storage or transport.

14. A method of securing batteries in parallel position for soldering electrical connecting bars between adjacent ends of batteries comprising:

placing a plurality of batteries in parallel but spaced apart recesses adapted to receive at least a portion of the batteries but without obstructing electrical terminals on at least one end of the batteries, the recesses being positioned in a top surface of a bottom plate means;

securing a clamping strap in one end of the bottom plate means;

placing a top plate means having parallel but spaced apart recesses on its bottom surface generally parallel but spaced apart to receive at least a portion of the batteries but without obstructing electrical terminals on at least one end of the batteries, over the batteries position in the bottom plate;

directing the strap from the first end of the bottom plate over the top plate means when placed over the batteries and threading the strap through a slot in the opposite end of the bottom plate, and doubling the strap back upon itself over the top plate.

15. The method of claim 14 further comprising placing one or more additional batteries over said batteries which have been placed in the recesses of the bottom plate and then placing the top plate means over said batteries and additional batteries.

* * * * *

UNITED STATES PATENT AND TRADEMARK OFFICE
CERTIFICATE OF CORRECTION

PATENT NO. : 5,308,717
DATED : May 3, 1994
INVENTOR(S) : Patrick D. Gordin

It is certified that error appears in the above-indentified patent and that said Letters Patent is hereby corrected as shown below:

In claim 8, column 6, line 32, please delete [mans] and substitute --means--.

In claim 14, column 8, line 7, please delete [.] and substitute --;

pulling the strap tight to apply converging pressure between the top and bottom plate means to produce a clamping force on the top plate to clamp the batteries into position between the top and bottom plates but without obstructing electrical terminals on at least one end of the batteries;

UNITED STATES PATENT AND TRADEMARK OFFICE
CERTIFICATE OF CORRECTION

PATENT NO. : 5,308,717
DATED : May 3, 1994
INVENTOR(S) : Patrick D. Gordin

It is certified that error appears in the above-indentified patent and that said Letters Patent is hereby corrected as shown below:

and securing the free end of the strap to secure the plates and batteries in said position.--

Signed and Sealed this

Twenty-third Day of August, 1994

Attest:

BRUCE LEHMAN

*Attesting Officer*     *Commissioner of Patents and Trademarks*